United States Patent
Lewis

(10) Patent No.: US 9,291,203 B2
(45) Date of Patent: Mar. 22, 2016

(54) TEMPERATURE SENSING GREASE FITTING WITH ALARM

(71) Applicant: Emerson Power Transmission Corp., Florence, KY (US)

(72) Inventor: Matthew I. Lewis, Valparaiso, IN (US)

(73) Assignee: Regal Beloit America, Inc., Beloit, WI (US)

( * ) Notice: Subject to any disclaimer, the term of this patent is extended or adjusted under 35 U.S.C. 154(b) by 66 days.

(21) Appl. No.: 14/201,972

(22) Filed: Mar. 10, 2014

(65) Prior Publication Data

US 2014/0266741 A1 Sep. 18, 2014

Related U.S. Application Data

(60) Provisional application No. 61/777,450, filed on Mar. 12, 2013.

(51) Int. Cl.
*G08B 17/00* (2006.01)
*F16C 41/00* (2006.01)
(Continued)

(52) U.S. Cl.
CPC ............... *F16C 41/00* (2013.01); *F16C 17/243* (2013.01); *F16C 19/525* (2013.01); *G01K 13/02* (2013.01); *F16C 33/102* (2013.01); *F16C 33/6625* (2013.01); *F16C 35/047* (2013.01); *F16C 2233/00* (2013.01)

(58) Field of Classification Search
CPC ...... G08B 21/182; G08B 17/06; G08B 21/00; H01H 37/5427; H01H 37/32; H01H 152/417; F16C 41/005
USPC .......................................... 340/584
See application file for complete search history.

(56) References Cited

U.S. PATENT DOCUMENTS

| | | | | |
|---|---|---|---|---|
| 3,686,605 A | * | 8/1972 | Hire | H01H 89/04 337/334 |
| 4,268,812 A | | 5/1981 | Satterlee | |
| 4,629,334 A | * | 12/1986 | Hochstein | F16H 57/0405 184/108 |
| 4,812,826 A | * | 3/1989 | Kaufman | B61K 9/06 246/169 A |

(Continued)

FOREIGN PATENT DOCUMENTS

| | | |
|---|---|---|
| JP | 08-268279 | 10/1996 |
| JP | 2005-344863 | 12/2005 |
| JP | 2009-210022 | 9/2009 |

OTHER PUBLICATIONS

International Search Report and Written Opinion mailed Jul. 24, 2014 in corresponding PCT international patent application Serial No. PCT/US2014/022942 (fifteen pages).

*Primary Examiner* — Jack K Wang
(74) *Attorney, Agent, or Firm* — Harness, Dickey & Pierce, PLC

(57) ABSTRACT

A bearing temperature monitoring system for detecting a temperature of bearing grease within a bearing housing. The bearing temperature monitoring system comprises a housing mountable to the bearing housing, a power source selectively outputting an electrical current, and an electrical circuit. The electrical circuit includes a temperature sensor component electrically coupled to the power source. The temperature sensor component can be responsive to a change in temperature such that the temperature sensor component opens or closes the electrical circuit at a predetermined temperature even in the absence of an applied electrical current. The electrical circuit further includes an alert device electrically coupled to the power source and the temperature sensor component that outputs an alert in response to the temperature sensor component.

17 Claims, 3 Drawing Sheets

(51) Int. Cl.

| | | |
|---|---|---|
| *G01K 13/02* | (2006.01) | |
| *F16C 17/24* | (2006.01) | |
| *F16C 19/52* | (2006.01) | |
| *G08B 21/00* | (2006.01) | |
| *G08B 17/02* | (2006.01) | |
| *H01H 37/04* | (2006.01) | |
| *B61F 15/12* | (2006.01) | |
| *B61K 9/04* | (2006.01) | |
| *F16C 33/66* | (2006.01) | |
| *F16C 35/04* | (2006.01) | |
| *F16C 33/10* | (2006.01) | |

(56) References Cited

U.S. PATENT DOCUMENTS

| | | | | |
|---|---|---|---|---|
| 4,818,119 | A * | 4/1989 | Busch | G01K 5/483 |
| | | | | 116/217 |
| 4,999,615 | A * | 3/1991 | Toupin | G01K 11/06 |
| | | | | 116/204 |
| 5,315,954 | A | 5/1994 | Richmond | |
| 6,161,962 | A * | 12/2000 | French | B61F 15/20 |
| | | | | 384/448 |
| 6,759,963 | B2 * | 7/2004 | Hayes | G01M 13/04 |
| | | | | 340/584 |

* cited by examiner

TEMPERATURE SENSING GREASE FITTING WITH ALARM

CROSS-REFERENCE TO RELATED APPLICATIONS

This application claims the benefit of U.S. Provisional Application No. 61/777,450, filed on Mar. 12, 2013. The entire disclosure of the above application is incorporated herein by reference.

FIELD

The present disclosure relates to bearings and, more particularly, relates to a temperature sensing grease fitting having an alarm or alerting system.

BACKGROUND AND SUMMARY

This section provides background information related to the present disclosure which is not necessarily prior art. This section also provides a general summary of the disclosure, and is not a comprehensive disclosure of its full scope or all of its features.

Bearing temperature rise is a good indicator that a bearing is not working at optimum conditions. A rise in temperature can be caused by many factors, but the result is degradation of the bearing useful life.

Previously, bearing temperature measurements were made using a thermocouple. A thermocouple uses dissimilar metals to conduct a signal. This signal is read back through a device that converts the signal to a temperature. The signal works with the difference in resistance between the two dissimilar metals. As the temperature changes, the resistance changes. Given two known temperatures and resistances, a linear relationship can be created between the resistance and the temperature. The reading device will convert the resistance to temperature based on these values.

Another conventional solution includes imbedding a temperature sensor into the casting of a mounted bearing. The sensor gives a linear relationship between the bearing temperature and a 4-20 mA electrical signal. The solution is meant, like the thermocouple, to attach to an external source for power and for temperature indication.

Both of these prior solutions have certain limitations. The thermocouple and embedded sensor both require external power input. Some bearing applications are not in a position where external power inputs can be easily brought to the bearing mounting location. This issue often leaves these bearings vulnerable to failure without maintenance personnel having sufficient warning. Should a failure like this happen, damage to the bearing and surrounding equipment may occur.

To alleviate this issue, some have employed a visual indicator that will alert if the bearing temperature reaches a certain point. The temperature is monitored through sensing equipment that runs on a power supply. The power supply is either an external power supply that must be brought in, or a battery power supply housed in the visual indicator unit. If the power is supplied by the batteries, a life limitation is put on the unit. The unit can only take measurements for a given period before the batteries run out of power. To mitigate this issue, previous attempts were used to incorporate a timer into the system. The user can set the unit to only take a reading at a certain interval. Although this does increase the life of the product, the life is still limited by the useful life of the battery power source.

According to the principles of the present teachings, a bearing temperature monitoring system is provided that alerts a user when the temperature of a bearing has reached a predetermined level. That is, the indicator device of the present teachings provides a clear status indicator that a bearing has reached a temperature that is undesirable in the application. It should also be recognized that the principles of the present teachings can also be used to indicate other, perhaps desired, temperatures. Because this bearing temperature monitoring system has an internal power supply in some embodiments, it requires no outside power system to be provided. The sensor component is capable of reacting to a temperature change without the need for applied power. Therefore, the internal power supply is essentially only used during an alert period. The indicator device of the present teachings is further compatible with existing bearing housing designs and, thus, does not require any additional modifications. Because no modifications to the housing are required, the indicator device of the present teachings can be retrofitted to products currently in use or marketed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
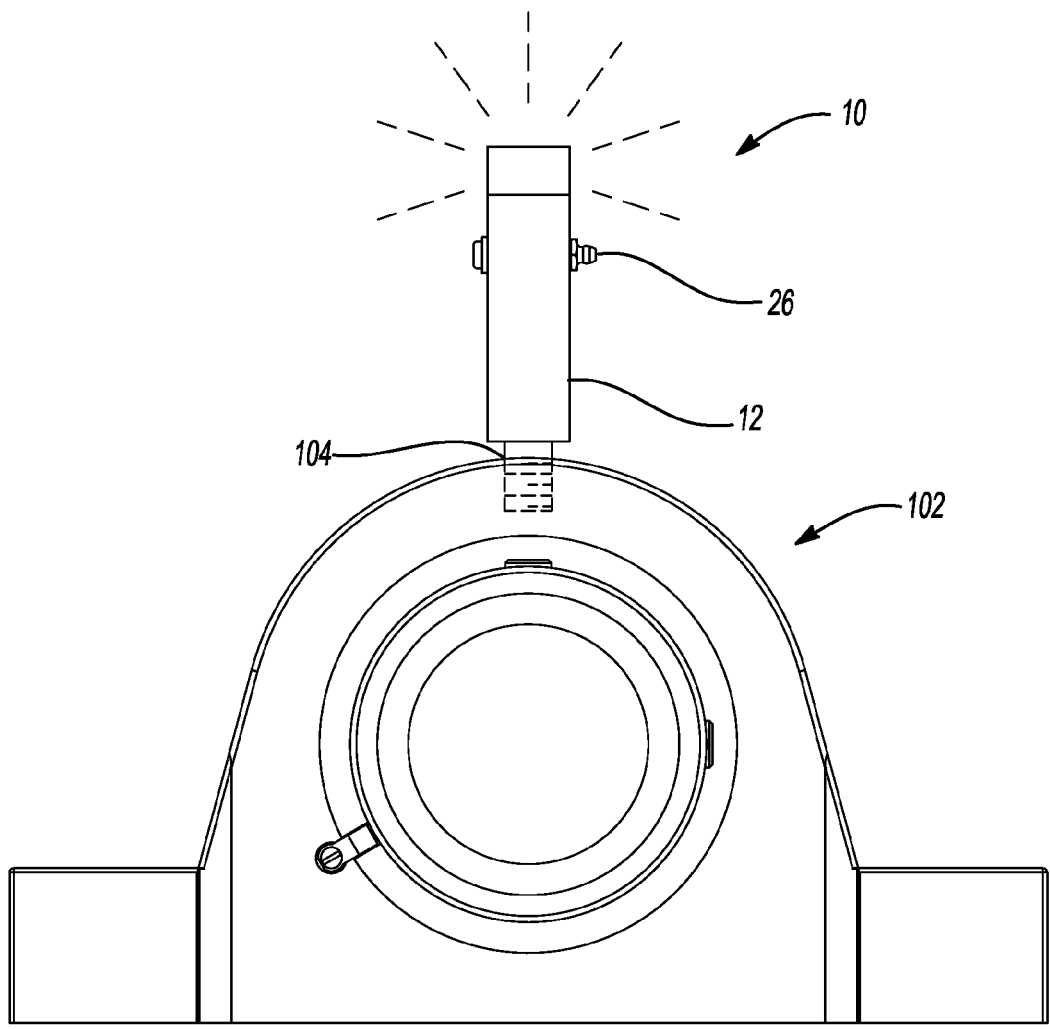
FIG. 1 is a schematic view of a bearing temperature monitoring system mounted on a conventional bearing housing.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, a bearing temperature monitoring system 10 is provided that alerts a user when a bearing has reached a predetermined temperature. In some embodiments, the temperature system 10 can comprise multiple sensors on a single bearing to determine when the bearing had reached multiple key temperatures.

Figure 2:
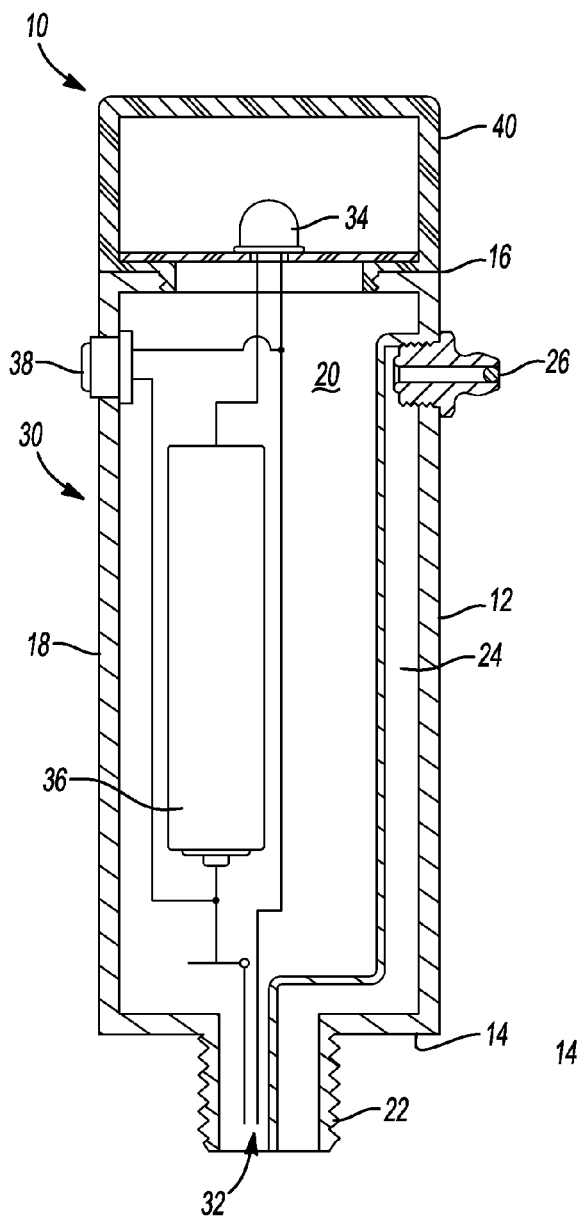
FIG. 2 is a schematic cross sectional view of the bearing temperature monitoring system according to some principles of the present teachings.
Figure 3:
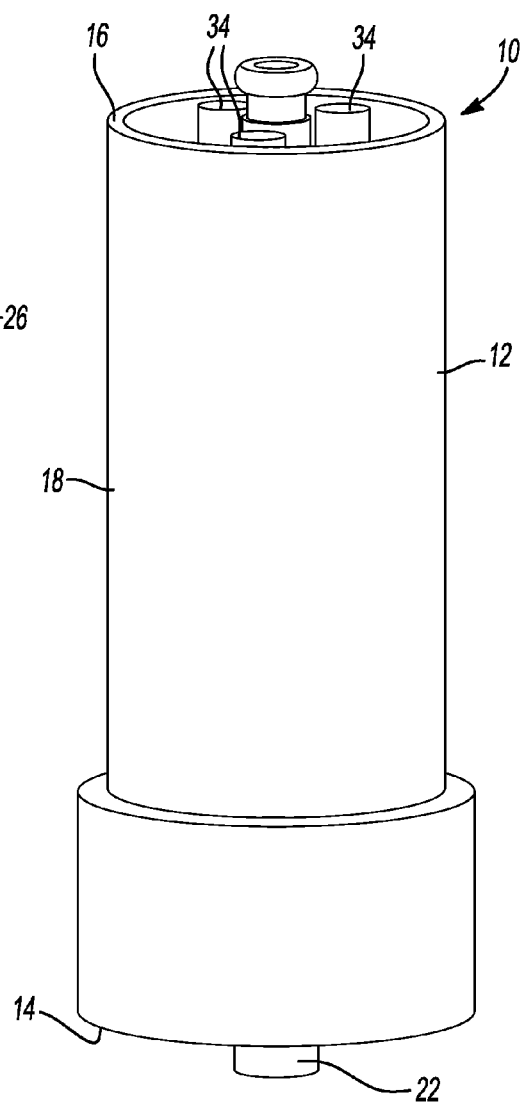
FIG. 3 is a perspective view of the bearing temperature monitoring system according to some principles of the present teachings.

With particular reference to FIGS. 1-3, bearing temperature monitoring system 10 can comprise a housing 12 adapted to be mounted to a bearing housing 102. In some embodiments, housing 12 can be generally cylindrically shaped having a proximal end 14 and an opposing distal end 16. Sidewalls 18 of housing 12 can enclose an internal volume 20. Housing 12 can comprise a fastener section 22, such as a threaded portion, that is sized and adapted to engage a corresponding feature 104 formed in bearing housing 102. More particularly, in some embodiments, corresponding feature 104 of bearing housing 102 can comprise a conventionally threaded aperture sized to receive a Zerk or other grease fitting. In this way, fastener section 22 of housing 12 of monitoring system 10 can be complementarily sized to threadedly engage the conventional threaded aperture of feature 104 to permit directly physical engagement of monitoring system 10 with bearing housing 102 without modification. As illustrated in FIG. 1, monitoring system 10 can be threadedly engaged with bearing housing 102.

With continued reference to FIGS. 2 and 3, monitoring system 10 can comprise a grease channel 24 disposed within housing 12. More particularly, in some embodiments, grease channel 24 can extend through a portion of fastener section 22, such as an interior bore extending generally longitudinally through fastener section 22, and housing 12 to a grease fitting 26 mounted to an exterior portion of housing 12, such as sidewall 18. Grease fitting 26 can be a Zerk fitting and be in fluid communication with grease channel 24 and a grease reservoir contained within bearing housing 102. Grease can be introduced into grease channel 24 and the grease reservoir via grease fitting 26 in a conventional manner to supply grease to bearing housing 102 and bearings contained therein, without the need to remove monitoring system 10 from bearing housing 102. It should be recognized that grease contained in grease channel 24 will be at a temperature generally consistent with grease contained within the grease reservoir of bearing housing 102.

In some embodiments, monitoring system 10 can comprise an electrical system 30 operable to detect a temperature of the grease in at least one of the grease reservoir of bearing housing 102 and/or grease channel 24. Electrical system 30 can output an alert or alarm to indicate a temperature of the associated grease. Grease temperature has been determined to be indicative of proper or improper operation of bearing and bearing housing components. In some embodiments, electrical system 30 can comprise a temperature sensor component 32, an alert device 34, a power source 36, a test switch 38, or combinations thereof. In some embodiments, temperature sensor component 32 can comprise a bimetallic switch disposed within or generally adjacent the bore formed in fastener section 22. Bimetallic switch 32 can comprise two or more members being made of differing metallic materials that convert temperature change into a mechanical deflection. Once a predetermined temperature is reached, the relative mechanical deflection of the metals is sufficient to close or open an electrical circuit, thereby providing indication of the predetermined temperature. It should be noted that a bimetallic switch 32 would continue to be closed or opened as long as the temperature is maintained, thus providing a constant indication of a proper temperature or an improper temperature.

In some embodiments, alert device 34 comprises one or more lights, such as an LED light. However, it should be readily understood that alternative alert devices can be used that provide visual, auditory, tactile, and the like, such as but not limited to alarms, sirens, flashing lights, vibration, computer display outputs, and the like. In some embodiments, alert device 34 can output alarm data. This data could be input to a discrete input module of a data acquisition system. This connection would allow for monitoring of bearings through any make or model of data acquisition system.

Power source 36, in some embodiments, can comprise a battery disposed within housing 12. Battery 36 can be electrically coupled to sensor component 32 and alert device 34 such that, in some embodiments, when sensor component 32 is in the open position, no electricity flows. In this way, the useful life of battery 36 is maximized. Once sensor component 32 reaches a predetermined temperature in response to increased temperature of the grease within grease channel 24 and/or the grease reservoir of bearing housing 102, sensor component 32 can close the circuit, thereby permitting electricity to flow to alert device 34 and output an alert. It should be understood that alternative power sources can be used, such as NC power sources, renewable energy sources, and the like. Understandably, depending on the power source used, a system for retaining a charge, such as a rechargeable battery or capacitor, may be used.

Optional test switch 38 can be electrically coupled between electrical outputs of power source 36 to selectively output power to alert device 34 to test the functionality of power source 36 and alert device 34.

In some embodiments, as illustrated in FIG. 2, a clear cover 40 can be mounted to distal end 16 of housing 12. Clear cover 40 can be a clear plastic cap that is disposed over alert device 34 to protect alert device and other internal components of monitoring system 10 during operation, yet permit output of an alert signal (e.g. light).

In some embodiments, variations on the present teachings are envisioned that can provide additional benefits. In some embodiments, monitoring system 10 can be screwed into the lubrication hole 104 of bearing housing 102. Monitoring system 10 can turn on and off alert device 34 based upon the bearing temperature being above or below a pre-set value. The monitoring system 10, in some embodiments, will not use any power in the off state. The bimetallic switch 32 thus can remain open below the pre-set value. Above the pre-set value, the bimetallic switch 32 will close and engage the alert device 34. When the temperature comes back below the pre-set value, the bimetallic switch 32 will again open and turn off the power to the alert device 34. In this manner, the life of the system is improved greatly over a system that constantly monitors the temperature through electrical signals.

Figure 4:
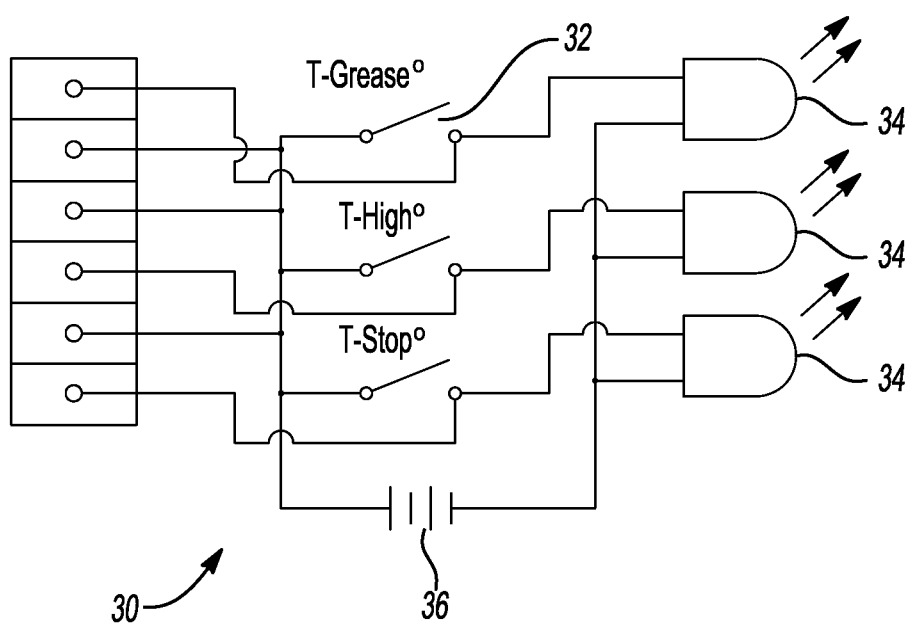
FIG. 4 is a circuit diagram of the bearing temperature monitoring system according to some principles of the present teachings.

In some embodiments as illustrated in FIG. 4, the present teaching may contain a plurality of temperature sensors (e.g. bimetallic switches 32 being actuatable at different temperatures) each coupled to a different alert device. This will enable the end user to determine if a bearing has achieved a key bearing temperature. The plurality of temperature alert devices 34 can help the end user determine the condition of the bearing, assess the criticality of the alarm, and take appropriate action to mitigate down time.

The present teaching may also contain output capabilities. The output will allow the user to connect the alert device 34 to an external system, if desired. The output may be connected to a discrete input equipped monitoring device. Because the alert device 34 has a pre-set temperature alarm imbedded, the user can easily set their external system to work in conjunction with the alarm that is already in place.

The present teachings do not require outside power generation. Because the entire electrical system is in the off state until the pre-set temperature is reached it will use no power until an alarm is tripped. All other systems require power to be supplied whenever a temperature measurement is made.

Furthermore, in some embodiments, the monitoring system may have a plurality of temperature sensors and alert devices 34 where prior solutions do not. The plurality of sensors and alert devices 34 will help the end user better determine the condition of the bearing and may assist in preventative maintenance of the bearing and reduce bearing down time.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing temperature monitoring system for detecting a temperature of bearing grease within a bearing housing, said bearing temperature monitoring system comprising:
   a housing mountable to the bearing housing;
   a power source selectively outputting an electrical current;
   an electrical circuit having a temperature sensor component electrically coupled to said power source, said temperature sensor component being responsive to a change in temperature such that said temperature sensor component opens or closes said electrical circuit at a predetermined temperature even in the absence of an applied electrical current, the temperature sensor component being disposed at least partially within the housing, said electrical circuit further having an alert device electrically coupled to said power source and said temperature sensor component, said alert device outputting an alert in response to said temperature sensor component; and
   a grease fitting extending from said housing, said grease fitting being in fluid communication with the bearing grease within the bearing housing via a grease channel extending within the housing from the grease fitting to the bearing housing.

2. The bearing temperature monitoring system according to claim 1 wherein said grease channel extending from said grease fitting to a proximal end of said housing, said grease channel being in fluid communication with the bearing grease within the bearing housing to permit introduction of bearing grease into the bearing housing without requiring removal of said housing from the bearing housing.

3. The bearing temperature monitoring system according to claim 2 wherein said housing comprises:
   a fastener section connectable with the bearing housing, said fastener section having an axial bore extending therethrough, said grease channel extending through at least a portion of said axial bore.

4. The bearing temperature monitoring system according to claim 1 wherein said housing comprises:
   a fastener section connectable with the bearing housing, said fastener section having a threaded section operable to threadingly engage corresponding threads formed on the bearing housing.

5. The bearing temperature monitoring system according to claim 1 wherein said temperature sensor component is a bimetallic switch, said bimetallic switch being responsive to a change in temperature even in the absence of said applied electrical current.

6. The bearing temperature monitoring system according to claim 5 wherein said bimetallic switch normally opens said electrical circuit thereby preventing flow of said electrical current until a predetermined temperature is reached at which said bimetallic switch closes said electrical circuit and permits flow of said electrical current from said power source to said alert device.

7. The bearing temperature monitoring system according to claim 1 wherein said alert device comprises an LED.

8. The bearing temperature monitoring system according to claim 1 wherein said alert device outputs a visual stimulus.

9. The bearing temperature monitoring system according to claim 1 wherein said alert device outputs an auditory stimulus.

10. The bearing temperature monitoring system according to claim 1 wherein said alert device outputs a tactile stimulus.

11. The bearing temperature monitoring system according to claim 1 wherein said alert device outputs a computer signal to a central processing unit.

12. The bearing temperature monitoring system according to claim 1 wherein said power source is a battery.

13. The bearing temperature monitoring system according to claim 1 wherein said power source is a renewable energy source.

14. The bearing temperature monitoring system according to claim 1, further comprising:
  a test switch electrically coupled between said power source and said alert device, said test switch being movable into a closed circuit position to permit testing of said power source and said alert device.

15. The bearing temperature monitoring system according to claim 1, further comprising:
  a plurality of said temperature sensor components each being responsive to a change in temperature such that each of said plurality of temperature sensor component opens or closes said electrical circuit at a corresponding predetermined temperature even in the absence of an applied electrical current, each of said corresponding predetermined temperatures being different than the other.

16. A bearing temperature monitoring system for detecting a temperature of bearing grease within a bearing housing, said bearing temperature monitoring system comprising:
  a housing having a threaded section, said threaded section being threadedly engageable with the bearing housing;
  a power source selectively outputting an electrical current, said power source being positioned at least partially within said housing;
  an electrical circuit having a bimetallic switch temperature sensor component disposed at least partially within said housing and electrically coupled to said power source, said bimetallic switch temperature sensor component being normally positioned in an opened circuit position and responsive to a change in temperature such that said bimetallic switch temperature sensor component moves to a closed circuit position at a predetermined temperature even in the absence of an applied electrical current, said electrical circuit further having an alert device electrically coupled to said power source and said bimetallic switch temperature sensor component, said alert device outputting an alert in response to said temperature sensor component; and
  a grease fitting extending from said housing, said grease fitting being in fluid communication with the bearing grease within the bearing housing via a grease channel extending within the housing from the grease fitting to the bearing housing.

17. A bearing temperature monitoring system for detecting a temperature of bearing grease within a bearing housing, said bearing temperature monitoring system comprising:
  a housing having a threaded section, said threaded section being threadedly engageable with the bearing housing;
  a power source selectively outputting an electrical current, said power source being positioned at least partially within said housing;
  an electrical circuit having:
    a first bimetallic switch temperature sensor component electrically coupled to said power source, said bimetallic switch temperature sensor component being normally positioned in an opened circuit position and responsive to a change in temperature such that said first bimetallic switch temperature sensor component moves to a closed circuit position at a first predetermined temperature even in the absence of an applied electrical current,
    a second bimetallic switch temperature sensor component electrically coupled to said power source, said bimetallic switch temperature sensor component being normally positioned in an opened circuit position and responsive to a change in temperature such that said second bimetallic switch temperature sensor component moves to a closed circuit position at a second predetermined temperature even in the absence of an applied electrical current, said second predetermined temperature being different than said first predetermined temperature;
  an alert device electrically coupled to said power source and said first bimetallic switch temperature sensor component and said second bimetallic switch temperature sensor component, said alert device outputting an alert in response to at least one of said first bimetallic switch temperature sensor component and said second bimetallic switch temperature sensor component; and
  a grease fitting extending from said housing, said grease fitting being in fluid communication with the bearing grease within the bearing housing via a grease channel extending along the housing from the grease fitting to the bearing housing.

* * * * *